C. M. LEECH.
TRANSMISSION GEAR.
APPLICATION FILED DEC. 18, 1909.

973,793.

Patented Oct. 25, 1910.
2 SHEETS—SHEET 1.

Witnesses
J. S. Freeman.

Inventor
Charles M. Leech,
By C. L. Parker,
Attorney

C. M. LEECH.
TRANSMISSION GEAR.
APPLICATION FILED DEC. 18, 1909.

973,793.

Patented Oct. 25, 1910.
2 SHEETS—SHEET 2.

Witnesses
J. S. Freeman

Inventor
Charles M. Leech,
By C. L. Parker, Attorney

UNITED STATES PATENT OFFICE.

CHARLES M. LEECH, OF LIMA, OHIO.

TRANSMISSION-GEAR.

973,793.

Specification of Letters Patent.  Patented Oct. 25, 1910.

Application filed December 18, 1909. Serial No. 533,791.

*To all whom it may concern:*

Be it known that I, CHARLES M. LEECH, a citizen of United States, residing at Lima, in the county of Allen and State of Ohio, have invented certain new and useful Improvements in Transmission-Gears, of which the following is a specification.

My invention relates to transmission gears, and the object of the same is to provide a device of the above character, whereby continuous rotation of a driving shaft, may be imparted to a driven shaft for driving the same at forward low and high speeds and reverse.

A further object of my invention is to provide a transmission gear which is controlled by a single lever.

My invention consists generally in the arrangement and combination of parts to be hereinafter described.

Figure 1:
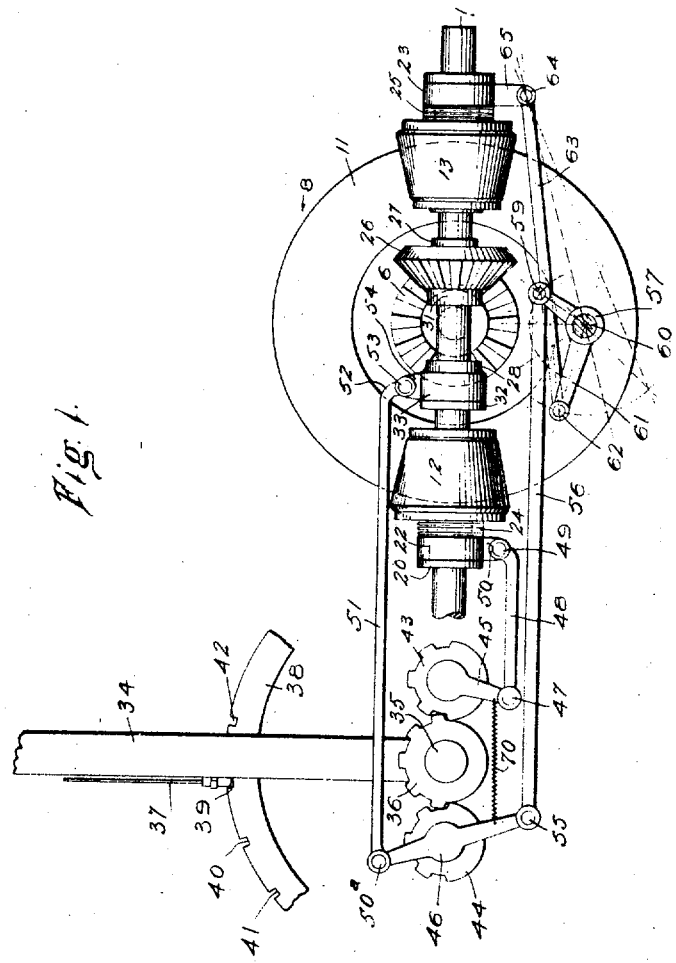
Figure 2:
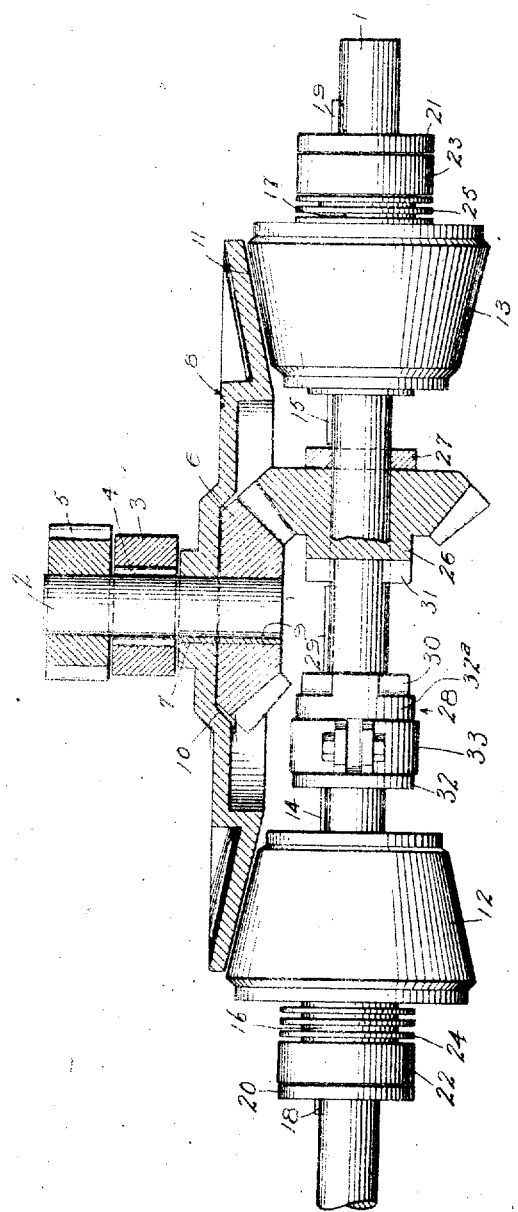

In the accompanying drawings forming a part of this specification, and in which like numerals are employed to designate like parts throughout the same, Figure 1 is a side elevation of the device. Fig. 2 is an enlarged fragmentary plan view of the same, certain portions being shown in section.

In the preferred embodiment of my invention, as illustrated in the drawings, 1 designates a longitudinally arranged driving shaft, which is rotated by an engine (not shown) arranged in the forward end of the vehicle. A transverse shaft 2 is arranged at substantially right angles to the driving shaft 1 and in horizontal alinement with said shaft 1. The transverse or driven shaft 2 is journaled through a fixed bearing 3, within which are arranged cylindrical rollers 4 which engage the driven shaft 2. Upon the outer end of the shaft 2 there is rigidly mounted a gear wheel 5 which is to mesh with an equalizing gear arranged upon the rear axle of the vehicle. The inner end of the driven shaft 2 is provided with a beveled gear 6 which is rigidly secured thereto by means of a key 9. Near the inner end of the shaft 2 is arranged a friction disk 8, which is keyed as at 7 to the driven shaft 2, or rigidly connected to the same in any suitable manner. The friction disk 8 is provided centrally thereof with a circular recess 10 within which the bevel gear 6 fits, as illustrated in Fig. 2. The friction disk 8 is further provided with a beveled engaging circular section 11, which extends to the periphery of said friction disk.

Reverse and forward low speed friction pulleys 12 and 13 are keyed upon the driving shaft 1 as at 14 and 15 respectively, and said pulleys are thus rotated by the shaft 1 and are capable of being moved longitudinally of the same. The friction pulleys 12 and 13 are frusto-conical in shape and are adapted to engage the friction disk 11 at diametrically opposite points. The friction pulleys 12 and 13 are provided with collars 16 and 17 respectively which are rigidly connected to the outer ends of the pulleys, and may be preferably formed integral therewith. The collars 16 and 17 are also keyed upon the shaft 1 as at 18 and 19, and said collars 16 and 17 are provided with outer flanged ends 20 and 21 respectively. Upon the collars 16 and 17, are loosely mounted rings 22 and 23 respectively. The ring 22 is capable of moving longitudinally upon the sleeve 16 and engages a coil spring 24 which is arranged upon said collar 16 and disposed between the friction pulley 12 and said ring 22. The ring 23 upon the collar 17 engages a coil spring 25 which is arranged upon said collar 17 and compressed between the pulleys 13 and said ring 23. The pulleys 12 and 13 are urged into engagement with the friction disk 8 by the movement of the rings 22 and 23 respectively, as will be hereinafter explained, and it is obvious that the rings 22 and 23 cause the pulleys 12 and 13 respectively to engage the friction disk 8 by the tension of the springs 16 and 17 respectively.

Between the pulleys 12 and 13 is arranged upon shaft 1 a bevel gear 26, which is disposed to mesh with the bevel gear 6 rigidly connected to the driven shaft 2. The bevel gear 26 is rotatably mounted upon the shaft 1 and is prevented from moving longitudinally upon said shaft toward the pulley 12, by means of its engagement with the bevel gear 6. The bevel-gear 26 is further prevented from moving longitudinally toward the pulley 13, by means of a collar 27 which is rigidly mounted upon the shaft 1. It is obvious by reference to Fig. 2, that the bevel gear 26 is always in mesh with the bevel gear 6, and that said bevel gear 26 is normally idle upon the driving shaft 1.

The driving shaft 1 is provided near the pulley 12 with a clutch head 28 which is keyed as at 29 to the shaft 1, whereby said clutch head 28 is rotated by the shaft 1 and is capable of moving longitudinally of the same. The clutch head 28 is provided upon one side thereof with a clutch face 30 which is adapted to coöperate with a corresponding clutch face 31 formed upon the inner end of the bevel gear 26, whereby said bevel gear 26 may be locked to the shaft 1. For the purpose of convenience I will hereinafter refer to the bevel gear 26 as the forward high speed gear. The clutch head 28 is provided with a flanged end 32, against which is arranged a ring 33, said ring being loosely mounted upon the clutch head 28 and held in place by the flange 32ª. Owing to the relative size of the friction pulleys 12 and 13 to the disk 8 it is obvious that the rotation of the shaft 1 which is imparted to the shaft 2 through either of said pulleys will be accordingly reduced. It is worthy of note that the bevel gear 26 is about the same size as the bevel gear 6 and that when the gear 26 is locked to the shaft 1, the rotation of the shaft 2 will accordingly be about the same as that of the shaft 1.

In connection with the portion of my device above described, I provide a controlling lever 34 which is rigidly mounted upon a rock shaft 35, upon which is arranged the stripped pinion 36, rigidly secured thereto by any suitable means. The controlling lever 34 is provided with a latch device 37, which is adapted to coöperate with a segmental rack 38, for locking said lever in a desired position. The segmental rack 38 is provided with a centrally arranged notch 39, termed the neutral notch. Forwardly of the neutral notch 39, the segmental rack 38 is provided with forward low speed and forward high speed notches 40 and 41 respectively. Rearwardly of the notch 39 the segmental rack 38 is provided with a reverse notch 42. In engagement with and upon opposite sides of the strip pinion 36, are arranged pinions 43 and 44, the pinion 43 being provided with a downwardly extending lever 45 which is rigidly connected thereto, and the pinion 44 being provided with a double-ended lever 46 rigidly connected thereto. The free end of the lever 45 is pivotally connected as at 47 to a rod 48 which has its opposite end pivotally connected as at 49 to a projection 50 formed upon the ring 22. The upper free end of the lever 46 is pivotally connected as at 50ª to one end of a rod 51, which has its opposite end bent as at 52 and pivotally connected as at 53 to a projection 54 formed upon the upper side of the ring 33. The lower free end of the lever 46 is pivotally connected as at 55 to a rod 56 the opposite end of which is pivotally connected to one arm of a bell-crank lever 57 as at 59. The bell-crank lever 57 is loosely mounted upon a fixed shaft 60. The other arm 61 of the bell-crank lever is pivotally connected at 62 to one end of a rod 63 and the opposite end of the rod 63 is pivotally connected at 64 to a projection 65 formed upon the ring 23. It is to be understood that the fixed shaft 60 extends laterally from the bell-crank lever upon one side and is flush with the same upon the side adjacent the rod 63, whereby the said rod 63 will be free to be moved below the shaft 60.

In the operation of my device, if it is desired to use the forward low speed, operating lever 34 is oscillated forwardly until the latch device 37 engages the notch 40. This movement of operating lever 34 will cause pinion 36 to be partially rotated counter clock-wise, and the pinion 36 will rotate the pinions 43 and 44 clock-wise. The lever 46 by means of connecting rod 51 will move the clutch head 28 toward the clutch face 31 of pinion 26 but not sufficiently near to engage the same. The connecting rod 56 will swing bell-crank lever 57 forwardly whereby connecting rod 63 will draw forward low speed friction pulley 13 into engagement with the friction disk 8. The connecting rod 48 will accordingly draw the reverse friction pulley 12 away from the friction disk 8.

When it is desired to use the high speed drive, the controlling lever 34 is oscillated forwardly until the same has its latch device in engagement with the notch 41. This further forward movement of controlling lever 34 will cause lever 45 by means of connecting rods 48 to draw the friction pulley 12 farther away from the friction disk. The lever 46 by means of rod 51 now advances the clutch head 30 into engagement with the clutch face 31 formed upon pinion 26. The lever 46 by means of connecting rod 56, now swings the bell-crank lever 57 forwardly until the arm 61 has reached its most forward point of travel, when the same will be swung rearwardly, whereby connecting rod 63 will accordingly disengage the pulley 13 from the disk 8. When it is desired to use the reverse speed the controlling lever is oscillated rearwardly until the latch device 37 engages the notch 42. By this movement the clutchhead 28 and pulley 13 are both disengaged from the friction disk 8 and the reverse friction pulley 12 forced into engagement with the friction disk. The lower ends of the levers 45 and 46 are connected by means of a retractile coil spring 70.

Having fully described my invention what I claim is:

1. The combination with a driving shaft, of a driven shaft, a friction disk and gear rigidly mounted upon said driven shaft, friction pulleys keyed upon said driving shaft to engage said friction disk at diametrically opposite points, a gear rotatably mounted upon said driving shaft and meshing with said first named gear, a clutch device keyed upon said driving shaft and adapted to engage said last named gear, a controlling lever for rotating a pinion, a plurality of pinions meshing with said first named pinion one of said last named pinions being provided with a lever, connecting means between said last named lever and one of said friction pulleys, the other of said last named pinions being provided with a double-ended lever, and connecting means between said double-ended lever and said clutch device and the other friction pulley.

2. The combination with a driving shaft, of a driven shaft, a friction disk and gear rigidly connected to said driven shaft, friction pulleys keyed upon said driving shaft for engagement with said friction disk, a gear loosely mounted upon said driving shaft and meshing with said first named gear, means for locking said last named gear to said driving shaft, a swinging lever, connecting rods pivotally connected to the opposite ends of said swinging lever, one of said connecting rods being pivotally connected to said locking means and the other to one of said friction pulleys, a swinging lever provided with connecting means with the other of said friction pulleys, and common means for simultaneously moving said swinging levers.

3. The combination with a driving shaft, of a driven shaft, a friction disk and gear rigidly connected to said driving shaft, friction pulleys keyed upon said driving shaft for engagement with said friction disk, a second gear loosely mounted upon said driving shaft and meshing with said first named gear, a clutch device for locking said last named gear to said driving shaft, a swinging lever, connecting means between one end of said lever and said clutch device, a bell-crank lever, connecting means between the opposite end of said swinging lever and said bell-crank lever, connecting means between said bell-crank lever and one of said friction pulleys, a swinging lever provided with connecting means with the other of said friction pulleys, and a single lever for moving said swinging levers.

4. The combination with a rotary disk and gear, of a rotary shaft arranged in operative relation thereto, a pulley keyed upon said rotary shaft, a second gear loosely mounted upon said shaft and meshing with said first named gear, a clutch device for locking said second gear to said shaft, a swinging lever, connecting means between one end of said swinging lever and said clutch device, connecting means between the opposite end of said swinging lever and said pulley, and means for actuating said swinging lever.

5. The combination with a rotary disk and gear, of a rotary shaft arranged in operative relation thereto, a pulley keyed upon said rotary shaft, a second gear loosely mounted upon said shaft and meshing with said first named gear, a clutch device for locking said second gear to said shaft, a swinging lever, connecting means between one end of said swinging lever and said clutch device, and connecting means between the opposite end of said swinging lever and said pulley.

6. The combination with a rotary disk and gear, of a rotary shaft arranged in operative relation thereto, a pulley keyed upon said shaft, a second gear loosely mounted upon said shaft and meshing with said first named gear, a clutch device for locking said second gear to said shaft, a double-ended swinging lever, connecting means between one end of said swinging lever and said clutch device, a bell-crank lever connecting means between said bell-crank lever and said double-ended lever, connecting means between said bell-crank lever and said pulley, and means for actuating said double-ended lever.

7. The combination with a rotary disk and gear, of a rotary shaft arranged in operative relation thereto, a pulley keyed upon said shaft, a second gear loosely mounted upon said shaft and meshing with said first named gear, a swinging lever, a clutch device for locking said second gear to said shaft, connecting means between one end of said swinging lever and said clutch device, a bell-crank lever, connecting means between the opposite end of said swinging lever and said bell-crank lever, connecting means between said bell-crank lever and said pulley, a second pulley keyed upon said shaft, a second swinging lever, connecting means between said second swinging lever and said second pulley, a controlling lever, and connecting means between said controlling lever and said first named swinging lever and said second swinging lever.

In testimony whereof I affix my signature in presence of two witnesses.

CHARLES M. LEECH.

Witnesses:
NELLIE HOOVER,
F. C. DALZELL.